United States Patent
Westermo et al.

[19]

[11] Patent Number: 5,932,810
[45] Date of Patent: Aug. 3, 1999

[54] PASSIVE PEAK DEFLECTION SENSOR

[75] Inventors: Bruce Westermo; Duane Crum; William Law, all of San Diego; Larry D. Thompson, Descanso; Robert Trombi, San Diego, all of Calif.; Raemon M. Polk, Atlanta, Ga.

[73] Assignee: Strain Monitor Systems, Inc., Norcross, Ga.

[21] Appl. No.: 09/030,315

[22] Filed: Feb. 25, 1998

[51] Int. Cl.⁶ ..................................................... G01G 19/12
[52] U.S. Cl. .............................................. 73/768; 73/770
[58] Field of Search ....................................... 73/768, 770

[56] References Cited

U.S. PATENT DOCUMENTS

| | | |
|---|---|---|
| 4,075,889 | 2/1978 | Jones . |
| 4,399,685 | 8/1983 | Atkey . |
| 4,813,435 | 3/1989 | Arms ........................................ 73/768 |
| 4,931,730 | 6/1990 | Olsen et al. . |
| 5,086,651 | 2/1992 | Westermo et al. . |
| 5,144,845 | 9/1992 | Pyke .......................................... 73/827 |
| 5,456,119 | 10/1995 | Nakazaki et al. ......................... 73/768 |
| 5,461,926 | 10/1995 | Bobb et al. . |
| 5,650,570 | 7/1997 | Goto et al. ................................ 73/768 |

FOREIGN PATENT DOCUMENTS 48906  6/1989  Japan .

*Primary Examiner*—Max H. Noori
*Attorney, Agent, or Firm*—Morris, Manning & Martin, L.L.P.

[57] ABSTRACT

A passive deflection gauge to detect peak deflection in a structural material or system since a given time is disclosed. The gauge includes any type of mechanical deflection sensor using a moveable or extensible core for measuring deflection. A stop moves the core only if a strain greater than the previously occurring maximum strain is present in the structural material or system. Any other movement of the stop will not move the core. Furthermore, a friction member may be incorporated to prevent spurious movement of the core.

23 Claims, 8 Drawing Sheets

PASSIVE PEAK DEFLECTION SENSOR

FIELD OF THE INVENTION

The invention relates generally to gauges for detecting strain or deflection in a structural member, and more particularly, to passive gauges adapted to maintain a measurement of peak strain or relative peak deflection over a given time period in a structural member.

BACKGROUND OF THE INVENTION

The lifespan of a structure is often dictated by the magnitude of strain applied to the structure. Strain or relative peak deflection in a structural material or system may cross a predetermined safety threshold and indicate the material or system should be removed from service, or that maintenance must be performed to ensure continued integrity. Thus, accurate peak strain measurements for a structure are important.

It will be understood that the term "strain gauge" as used herein refers to both strain and deflection gauges. Strain gauges are divided into passive and active categories. Passive strain gauges include a passive deflection sensor and generally measure strain only at the sampled time. Thus, if the member is not undergoing the peak strain when the passive strain gauge is activated, the peak strain is not measured. Active strain gauges avoid this limitation by using a deflection sensor coupled with an on-site microprocessor constantly running to measure and store into an electronic memory the instantaneous deflection of a structural member. Peak strain is determined by reviewing the stored deflection information. However, active strain gauges are more complicated, fragile and expensive than passive strain gauges due to the incorporation of the microprocessor and memory components.

What is needed is a passive strain gauge that more accurately retains its state caused by peak strain or deflection for later measurement.

SUMMARY OF THE INVENTION

The above limitations of existing strain gauges are overcome by a device for measuring peak deflection in a structural member constructed in accordance with the principles of the present invention. The device includes a first position sensor having a first fixed reference and a first member. The first position sensor is adapted to generate a signal corresponding to a distance between a first measurement point on the first member and the first fixed reference. The first measurement point of the first member is moveable along a first axis which passes through the first member and the first fixed reference. The device also includes a stop operatively engaged with the first member such that the stop moves the first measurement point on the first member relative to the first fixed relevance in a first direction along the first axis in response to maximum stress exerted in the first direction. Furthermore, the stop releases the first member in response to stress exerted in a second direction along the first axis that is reciprocal to the first direction. Accordingly, when the device is operated, the first measurement point of the first movable member remains at its position of greatest travel in relation to the first fixed reference along the first axis in the first direction. Embodiments of the device can be configured to measure tensile or compressive motion in a structural member.

The invention also contemplates a single device capable of measuring peak deflection or strain resulting from both tensile and compressive stress in a structural member. This embodiment further includes a second position sensor having a second fixed reference and a second member. The second position sensor is adapted to generate a signal corresponding to the distance between a second measurement point on the second movable member and the second fixed reference. The second measurement point of the second member is movable along a second axis passing through the second member and the second fixed reference. The first and second axes are generally parallel. Furthermore, the stop operatively engages the second member so that the stop moves the second measurement point relative to the second fixed relevance in the second direction along the second axis in response to maximum stress exerted in the second direction along the second axis, and the stop releases the second member in response to stress exerted in the first direction. Accordingly, the second measurement point on the second member remains at its position of greatest travel in relation to the second fixed reference along the second axis in the second direction while the first measurement point on the first member remains at its position of greatest travel in relation to the first fixed reference along the first axis in the first direction.

Various embodiments of the stop are available. In one embodiment, the stop is a pusher that moves the first measurement point in the first direction when the pusher moves beyond its previous maximum stress in the first direction, but does not move the first member in the second direction when the pusher moves in the second direction. The stop may also be a hollow member including a wall defining a chamber and having an opening larger than the diameter of the first member. An end of the first member passes through the opening into the chamber, and ends in a head larger in diameter than that of the opening in the wall. Movement of the hollow member in the first direction beyond its previous maximum movement in the first direction moves the first member, but the hollow member is free to move in the second direction without moving the first member.

Accordingly, an object of the invention is to provide a passive peak deflection sensor.

Another object of the invention is to provide a passive peak deflection sensor capable of measuring deflection in more than one direction.

Yet another object of the invention is to provide a passive peak deflection sensor having a movable or extensible element maintained at its position of peak deflection from an initial time.

Other objects, advantages and features of the present invention will be more readily understood from the following detailed description of the specific embodiments thereof when read in conjunction with the accompanying drawings.

BRIEF DESCRIPTION OF THE DRAWINGS

FIGS. 9(a)–9(e) shows a second strain sensing unit to measure both tensile and compressive strain.

DETAILED DESCRIPTION OF THE INVENTION

Figure 1A:
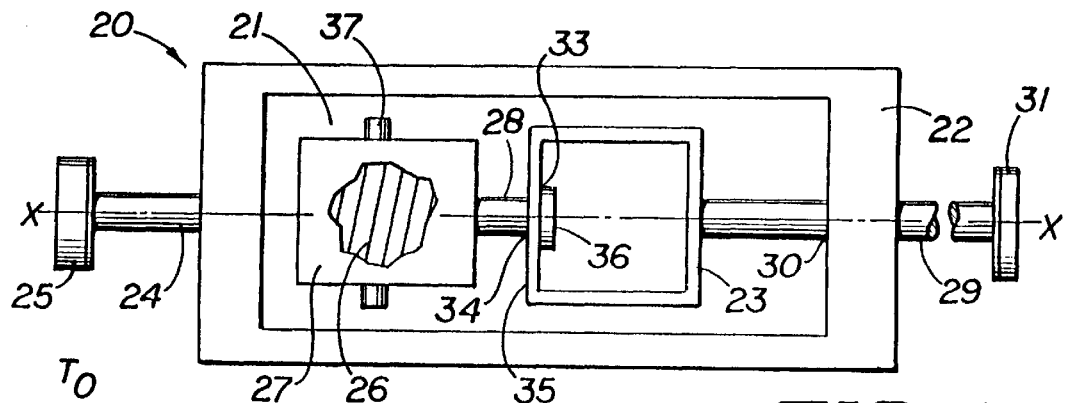
FIGS. 1(a)–1(d) show a strain sensing unit including an inductance sensor to measure deflection caused by tensile stress.
Figure 1B:
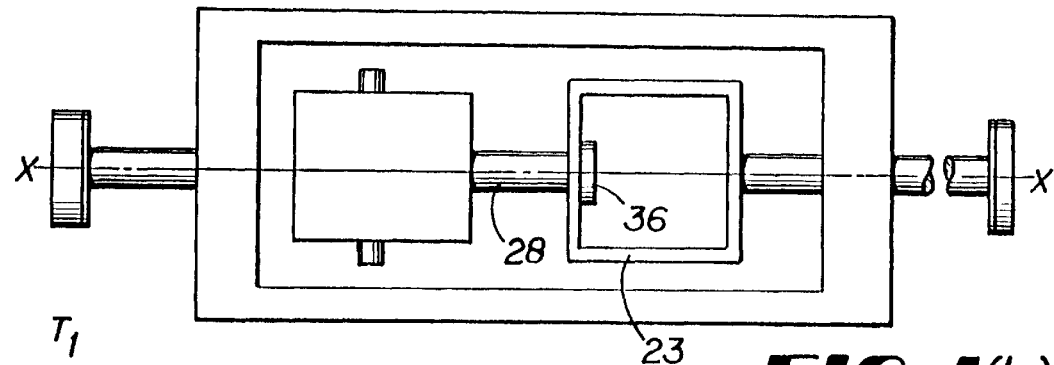
Figure 1C:
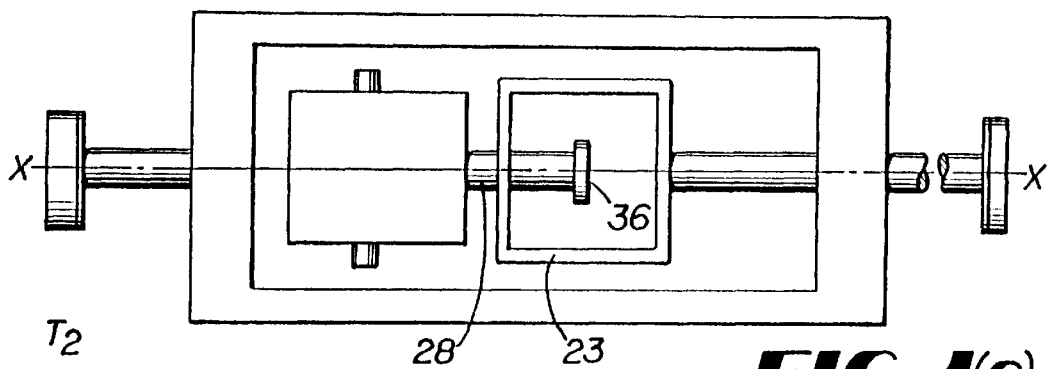
Figure 1D:
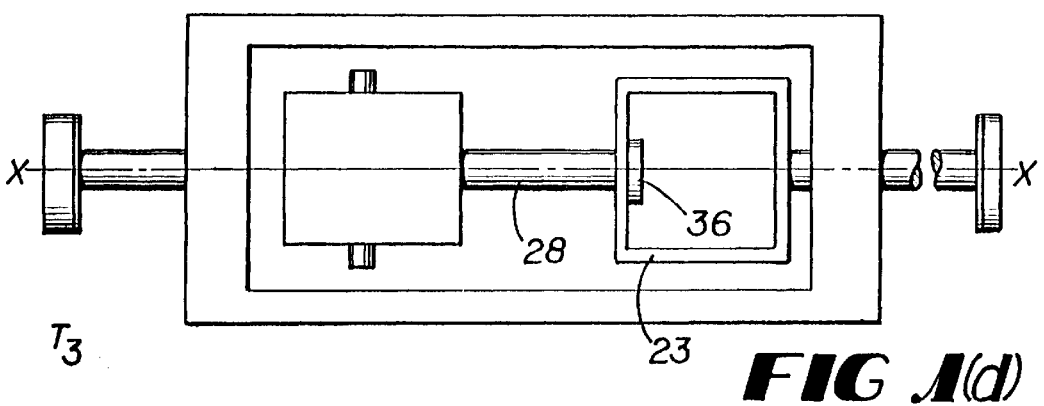
Figure 2:
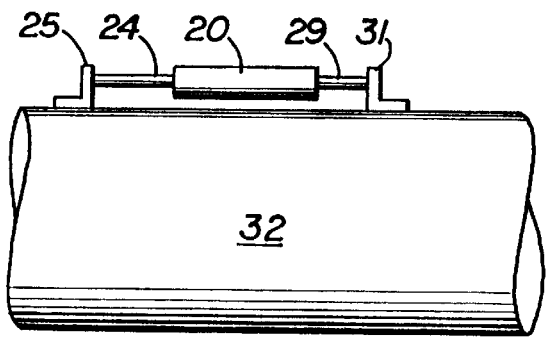
FIG. 2 shows the unit of FIG. 1 mounted to a structural member.

A strain sensing unit 20 made in accordance with the principles of the present invention is shown in FIGS. 1 and 2. Unit 20 includes a housing 22 enclosing a sliding bracket 23 and an inductance deflection sensor 21. Sensor 21 is also referred to as a linear variable differential transformer ("LVDT"). A rod 24 is fixedly mounted at one end to housing 22 and at its other end to a mounting bracket 25. Sensor 21 includes an inductive coil unit comprising a coil 26 within a housing 27. Coil 26 surrounds a ferromagnetic cylindrical core 28 which can slide within coil 26. Sensor 21 is fixedly mounted to housing 22 at bracket 37 and can be replaced by any other well known mechanical deflection sensor, including a linear potentiometer, capacitance displacement sensor and other LVDTs.

Sliding bracket 23 is fixedly connected to one end of a movable rod 29. Movable rod 29 passes through an aperture 30 in housing 22 and can freely slide within aperture 30. Movable rod 29 is fixedly connected at its other end to a mounting bracket 31. Mounting brackets 25 and 31 are fixedly connected to a beam 32. Mounting brackets 25 and 31 can mount strain sensing unit 20 to the surface of any structural material or system.

The right marginal end portion 33 of core 28 passes through an aperture 34 in wall 35 of bracket 23 and ends in a head 36 having a diameter greater than that of aperture 34. Accordingly, movement of movable rod 29 and bracket 23 to the right draws core 28 a corresponding distance to the right. However, movement of movable rod 29 and bracket 23 to the left causes wall 35 to move along core 28 without moving core 28. As such, the position of core 28 is representative of the maximum positive deflection between mounting brackets 25 and 31 over a given time period. Specifically, unit 20 measures maximum positive deflection as a result of tensile stress on beam 32 over a given time period.

Many strain gauges use a moveable or extensible member. Core 28 is an example of a moveable member. A second example of a moveable member is a sliding traveler in optical strain gauges. In one embodiment of the optical strain gauge, an emitter and sensor are mounted to a sliding traveler within an optical displacement transducer. The sensor measures the time it takes for light from the emitter to reflect from a fixed point within the optical strain gauge to the sensor. Any change in the reflection time indicates a change in distance between the sensor and fixed point. An example of an extensible element is the deformable transformation induced plasticity alloyed steel ("TRIP") core of some phase change strain gauges. Phase change strain gauges are described in U.S. Pat. No. 5,086,651, the disclosure of which is incorporated by reference. In a phase change strain gauge, the elongation of the TRIP core causes a change in phase of the TRIP material. This change in phase is measurable, and can be converted to a strain measurement. The instant invention is equally applicable to strain gauges using moveable or extensible members.

An example of the operation of unit 20 is now provided.

$T_0$

FIG. 1(a) shows unit 20 at an initial reference $T_0$. Bracket 23 and head 36 are engaged such that any tensile strain in beam 32 along axis x—x causes a corresponding movement of core 28 to the right with respect to housing 22.

$T_1$

FIG. 1 (b) shows unit 20 at a time $T_1$ after initial time $T_0$ at which a tensile stress acts along axis x—x to move mounting bracket 31, rod 29, bracket 23 and core 28 relative to housing 27.

$T_2$

FIG. 1(c) shows unit 20 at a time $T_2$ after time $T_1$ at which a compressive stress acts along axis x—x in beam 32. As can been seen, core 28 has retained its position from $T_1$, but bracket 23 has moved significantly to the left, even past its position at time $T_0$. The position of core 28 at $T_2$ is still representative of the maximum tensile strain in beam 32 along axis x—x since time $T_0$.

$T_3$

FIG. 1(d) shows unit 20 at a time $T_3$ after time $T_2$ where a tensile stress greater than the tensile stress at $T_1$ acts along axis x—x in beam 32. Accordingly, core 28 is drawn by bracket 23 further to the right than its position at $T_1$, and as such, now corresponds to the new maximum strain in beam 32 since $T_0$.

Converting the position of core 28 to a measurement of strain in beam 32 is well known. The inductance of sensor 21 varies with the length of core 28 within coil 26. The inductance of sensor 21 is measured at $T_0$, the initial reference. At $T_0$, core 28 is positioned such that substantially all of coil 26 surrounds a portion of core 28. When tensile strain draws a portion of core 28 out of coil 26, at least a portion of coil 26 is no longer surrounding coil 28. This alters the inductance of sensor 21. The inductance is measured again at $T_3$, and the difference in inductance between $T_0$ and $T_3$ calculated. The inductance of sensor 21 changes linearly with the amount of coil 26 surrounding core 28. As such, the deflection of core 28 from time $T_0$ can be determined. This deflection calculation is then used to calculate maximum strain in beam 32 since $T_0$. The principles of the invention are equally applicable to any sensor adapted to measure a linear deflection as a function of a measurable property (e.g., resistance). Examples of sensors measuring an electrical property, collectively known as electrical displacement transducers, are capacitance sensors, inductance (magnetic) sensors, piezoelectric sensors, and resistance sensors. An example of a sensor measuring an optical property, otherwise known as an optical displacement transducer, is a fiberoptic sensor.

Figure 3A:
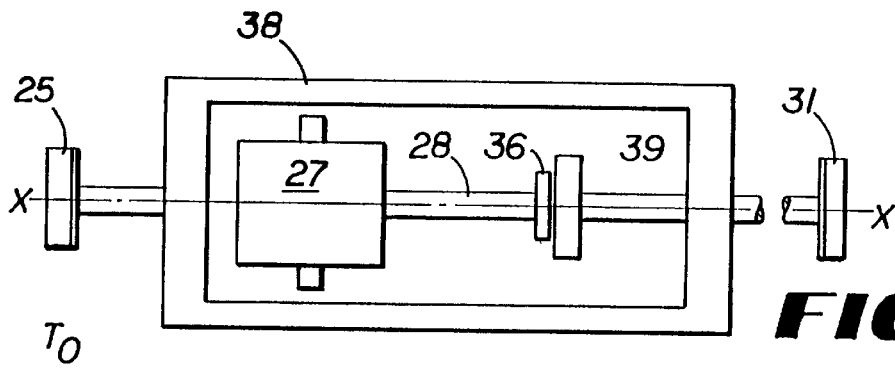
FIGS. 3(a)–3(d) show a strain sensing unit including an inductance sensor to measure deflection caused by compressive stress.
Figure 3B:
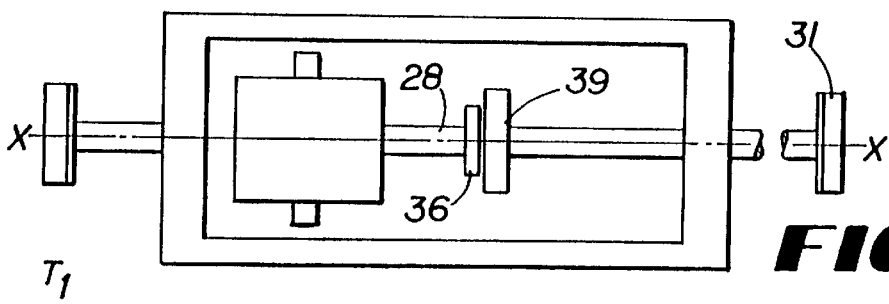
Figure 3C:
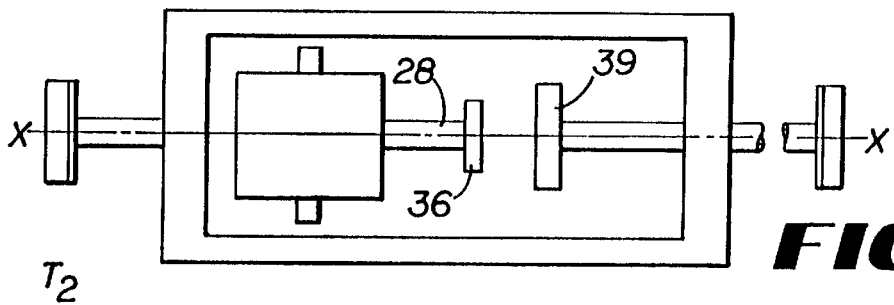
Figure 3D:
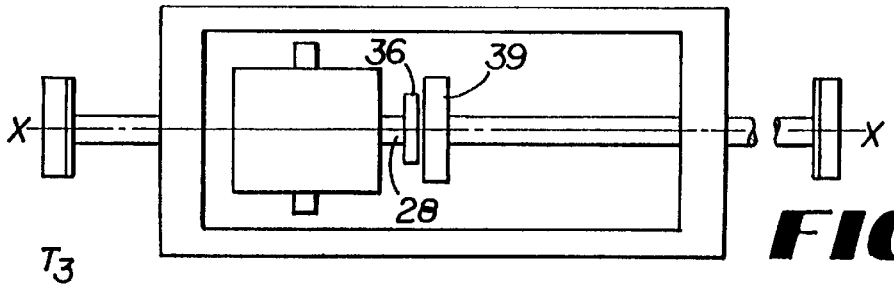

FIG. 3(a) shows a strain sensing unit 38. Unit 38 and unit 20 share many components, however unit 38 is configured to measure compressive strain. Bracket 23 of unit 20 is replaced in unit 38 by a pusher 39. When stress applied to beam 32 causes brackets 25 and 31 to move toward one another, pusher 39 eventually contacts head 36 forcing core 28 to the left (FIG. 3(b)). As the stress causing the compressive strain is removed, pusher 39 disengages from head 36 and moves to the right (FIG. 3(c)). After an initial compressive strain, pusher 39 will only contact head 36 when the previous maximum compressive strain is surpassed (FIG. 3(d)). Therefore, measurements of the inductance of coil 26 in unit 38 can be used to calculate maximum compressive deflection and compressive strain since an initial time using the method previously discussed for calculating tensile strain.

Figure 4:
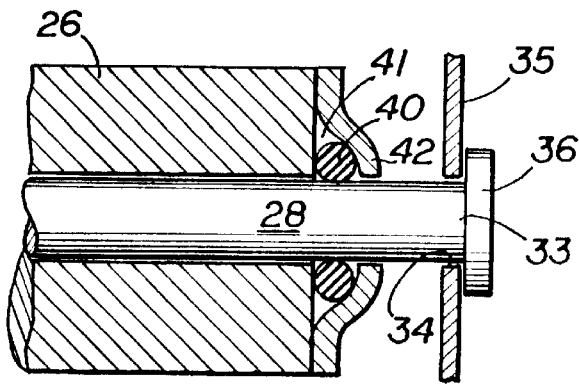
FIG. 4 shows detail of a portion of the unit of FIG. 3 including a friction member.

Adverting to FIG. 4, a friction member, such as an O-ring 40, can be used to prevent slippage of core 28. O-ring 40 rests in an annular seat 41 and is held in place by an annular shoulder flange 42. O-ring 40 fits tightly around core 28 and acts to prevent spurious forces from shifting core 28. Thus, the position of core 28, which corresponds to maximum strain, is maintained.

Figure 5:
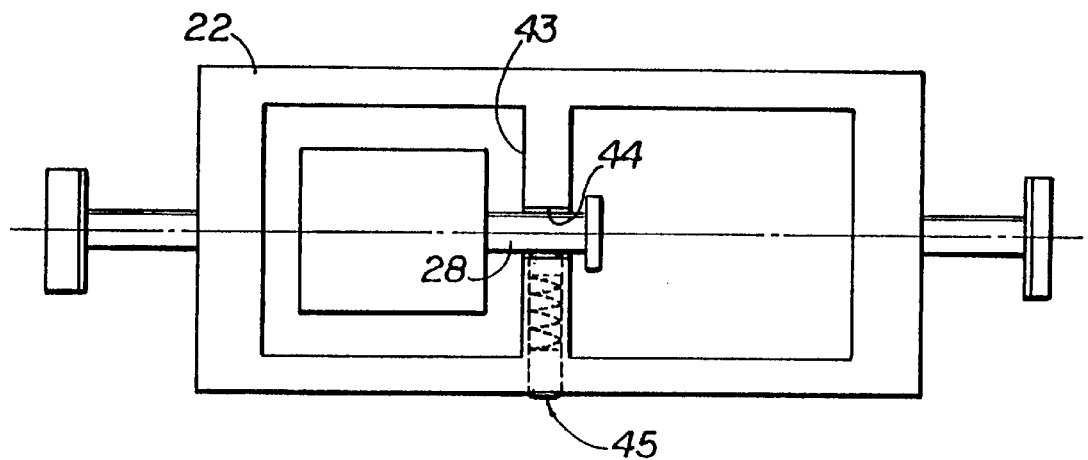
FIG. 5 shows an alternative embodiment of a friction member in a strain sensing unit.
Figure 6:
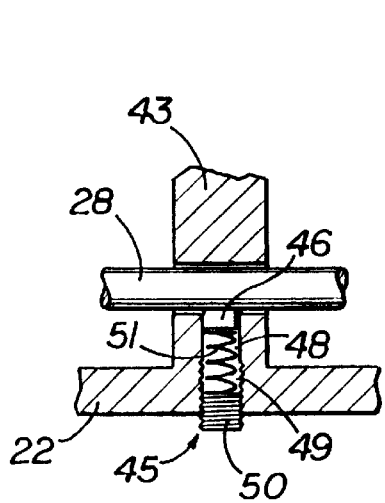
FIG. 6 shows the components of the friction member of FIG. 5 in more detail.

An alternative and preferred friction member to prevent spurious movement of core 28 is shown in FIG. 5. Housing 22 includes a wall 43 having an aperture 44 through which core 28 slides. A set screw structure 45, shown best in FIG. 6, allows for adjustable pressure between a friction pad 46 and core 28. Set screw structure 45 includes a bore 48 for communication between the outer surface of housing 22 and aperture 44. The portion 49 of bore 48 closest to the outer surface of housing 22 is threaded. A set screw 50 engages threaded bore portion 49 and controls the tension of a compression spring 51 positioned within bore 48. Compression spring 51 forces friction pad 46 into contact with core 28 to prevent spurious movement of core 28.

As shown in FIGS. 7(a)–(e), a single passive strain sensing unit to measure both peak compressive strain and peak tensile strain can be provided according to the previously disclosed principles of the invention.

$T_0$

Figure 7A:
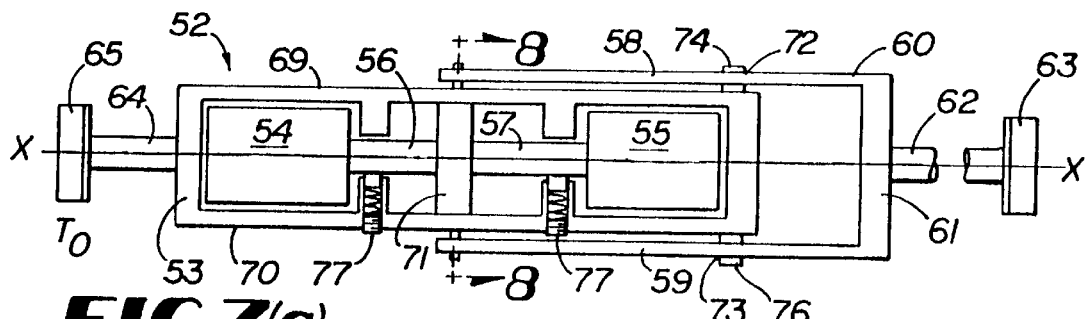
FIGS. 7(a)–7(e) shows a strain sensing unit for measuring both tensile and compressive strain.

FIG. 7(a) shows a strain sensing unit 52 at an initial time $T_0$. Unit 52 includes a housing 53 enclosing two inductance deflection sensors, 54 and 55. Deflection sensors 54 and 55 each include a core, 56 and 57, respectively. One end of housing 52 is within the arms 58 and 59 of a U-shaped shoe 60. The base 61 of shoe 60 is fixedly connected to one end of a movable rod 62. The other end of movable rod 62 is fixedly connected to a mounting bracket 63. Similarly, one end of a rod 64 is fixedly connected to housing 53 with its other end fixedly connected to a mounting bracket 65. Mounting brackets 63 and 65 are mounted to beam 76, the subject structural member shown in FIG. 8.

Figure 8:
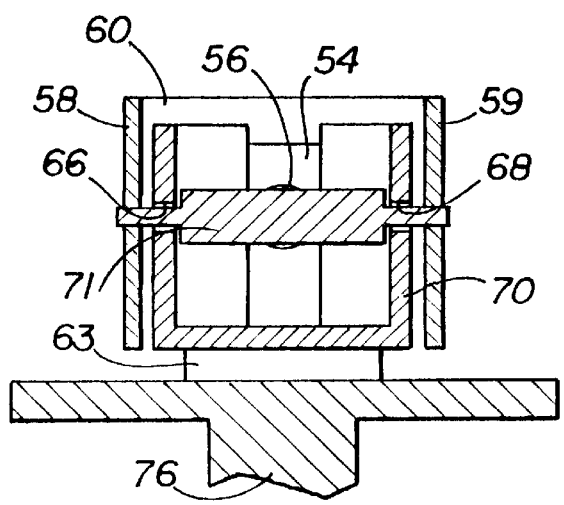
FIG. 8 is a cross section view taken along line 8–8 of FIG. 7.

Also shown in FIG. 8 are matching slots 66 and 68 which are opposite one another in the upper wall 69 and lower wall 70 of housing 53. A pusher 71 is fixedly connected at its ends to arms 58 and 59 and passes through slots 66 and 68. As seen in FIG. 7, matching slots 72 and 73 are present in arms 58 and 59 of shoe 60. Rods 74 and 75 are fixedly connected at one end to the right marginal end of walls 69 and 70, respectively, and pass through slots 72 and 73, respectively, to assist in positioning shoe 60 in relation to housing 53. Set screw structures, severally indicated at 77, prevent spurious slippage of shafts 56 and 57. At $T_0$ cores 56 and 57 both engage pusher 71.

$T_1$

Figure 7B:
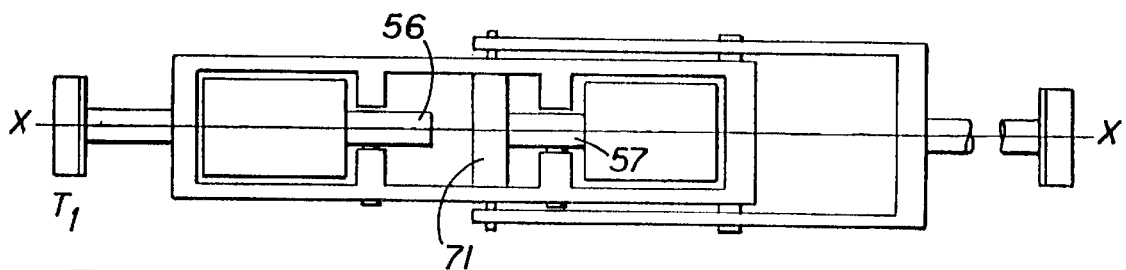

FIG. 7(b) shows unit 52 at a time $T_1$ after time $T_0$. A tensile stress acts along axis x—x in beam 76 resulting in a strain, causing shoe 60 and housing 53 to move apart and pusher 71 to displace core 57 to the right. When this tensile strain is removed, pusher 71 disengages core 57 and moves back toward its position at time $T_0$. However, core 57 remains at the maximum deflection caused by the tensile stress.

$T_2$

Figure 7C:
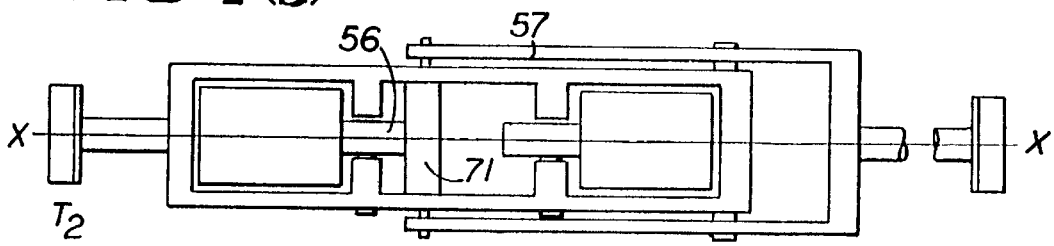

At time $T_2$, shown in FIG. 7(c), a compressive stress acts in beam 76 along axis x—x causing shoe 60 and housing 53 to move toward one another and pusher 71 to displace core 56 to the left. When the compressive stress is removed from beam 76, pusher 71 disengages core 56 and moves back towards its position at time $T_0$. However, core 56 remains at the maximum deflection caused by the compressive stress.

$T_3$

Figure 7D:
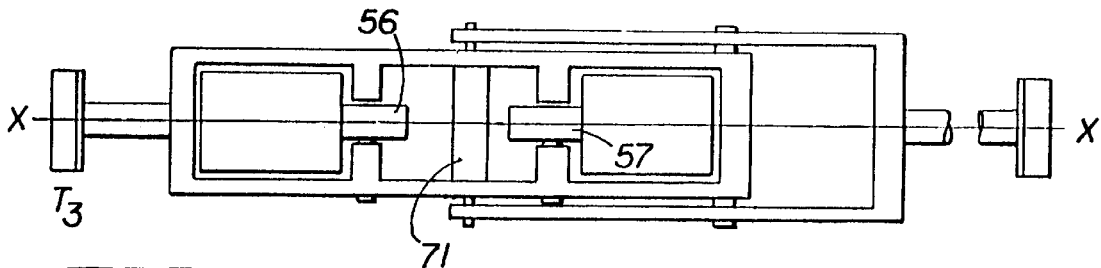

Pusher 71 will further displace core 56 or 57 only if a compressive or tensile stress in beam 76 along axis x—x occurs that is greater than the stress along axis x—x at $T_1$ or $T_2$. FIG. 7(d) shows a time $T_3$ when a tensile stress less than the tensile stress at $T_1$ acts in beam 76 along axis x—x.

$T_4$

Figure 7E:
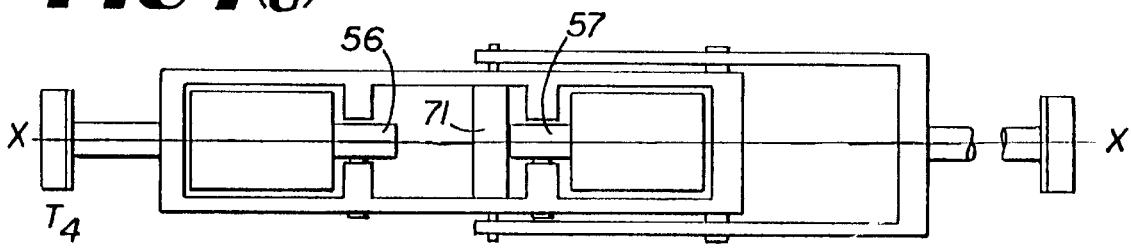

FIG. 7(e) shows a time $T_4$ where a tensile stress greater than the tensile stress at $T_1$ acts along axis x—x in beam 76. Accordingly, pusher 71 re-engages and further displaces core 57 to the right. Thus, core 57 continues to correspond to the maximum deflection caused by tensile stress along axis x—x in beam 76 since time $T_0$.

A second embodiment of a combination compression and tensile sensor is shown in FIG. 9.

$T_0$

Figure 9A:
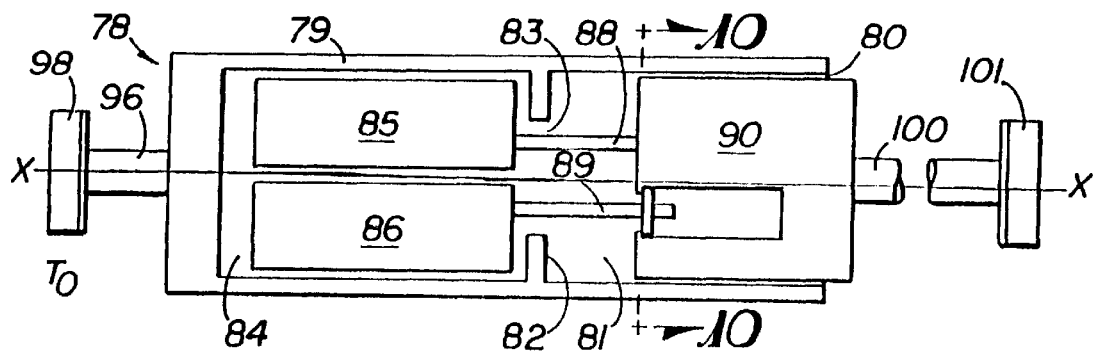

FIG. 9(a) shows a strain sensing unit 78 at an initial time $T_0$. Unit 78 includes a cup shaped housing 79 having an opening 80 at its right end. Opening 80 is generally cylindrical and leads to a cylindrical chamber 81 ending at an annular shoulder 82 having an opening 83. Opening 83 leads into a second chamber 84. A compression deflection sensor 85 and tensile deflection sensor 86 are mounted within second chamber 84. Deflection sensor 85 and 86 can be any of the sensor types discussed earlier. Compression deflection sensor 85 and tensile deflection sensor 86 each have a shaft, 88 and 89 respectively, proceeding through opening 83. A pusher 90 having a complimentary cross-section to that of chamber 81 slides freely within chamber 81.

Figure 10:
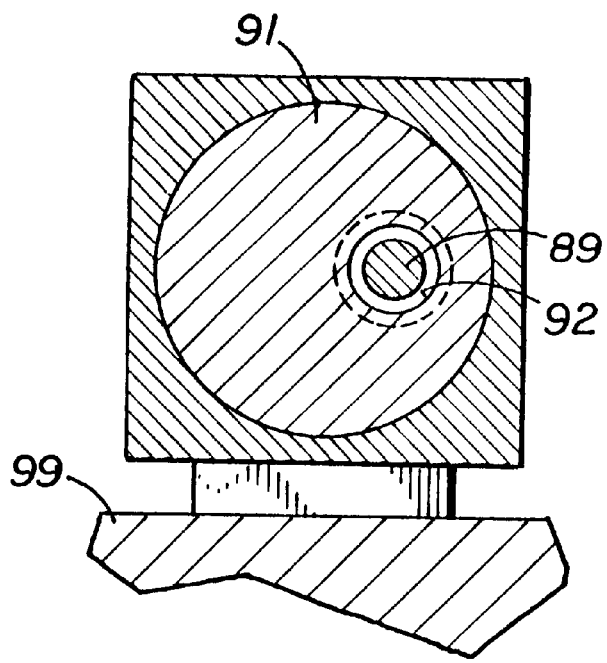
FIG. 10 shows the view taken along line 10–10 in FIG. 9(a).
Figure 11:
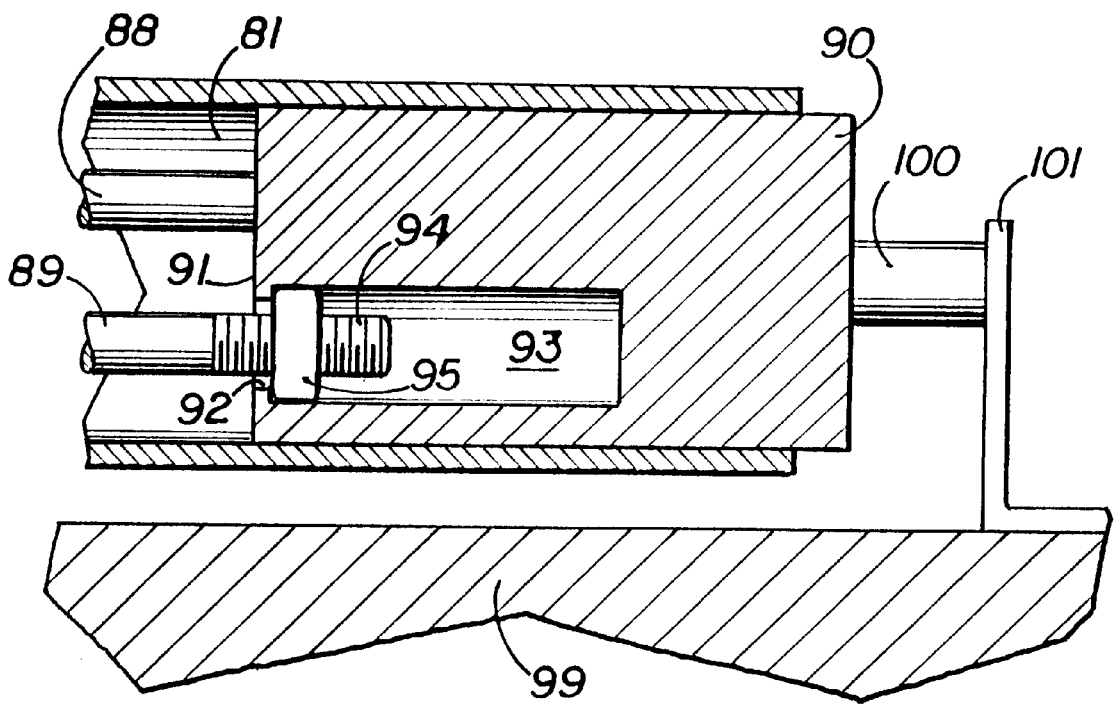
FIG. 11 shows the pusher of the unit of FIG. 9(a) in more detail.

Pusher 90 is best shown in FIGS. 10 and 11. Left face 91 of pusher 90 includes a circular aperture 92 larger in diameter than that of shaft 89. Shaft 89 passes through aperture 92 into chamber 93 where it terminates at threaded end 94. A nut 95 screws onto end 94, but is too large to pass through aperture 92. Accordingly, movement of pusher 90 to the right draws shaft 89 to the right, while pusher 90 slides along shaft 89 without moving shaft 89 when pusher 90 moves to the left. Shaft 88 is configured to engage face 91. Accordingly, rightward movement of pusher 90 does not move shaft 88, while leftward movement causes face 91 to engage and move rod 88. Housing 74 is fixedly mounted to one end of a rod 96 fixedly connected at its other end to a mounting bracket 98. Pusher 90 is fixedly connected to one end of a rod 100 fixedly connected at its other end to mounting bracket 101. Mounting brackets 98 and 101 are each fixedly mounted to beam 99.

$T_1$

Figure 9B:
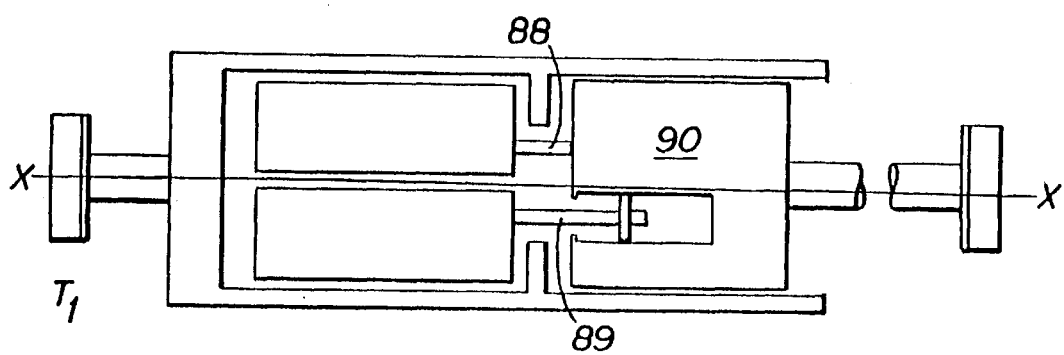

At time $T_1$, shown in FIG. 9(b), compressive strain along axis x—x in beam 99 causes pusher 90 to slide deeper into chamber 81 toward shoulder 82. Face 91 moves shaft 88 a corresponding distance to the left. However, shaft 89 does not move.

$T_2$

Figure 9C:
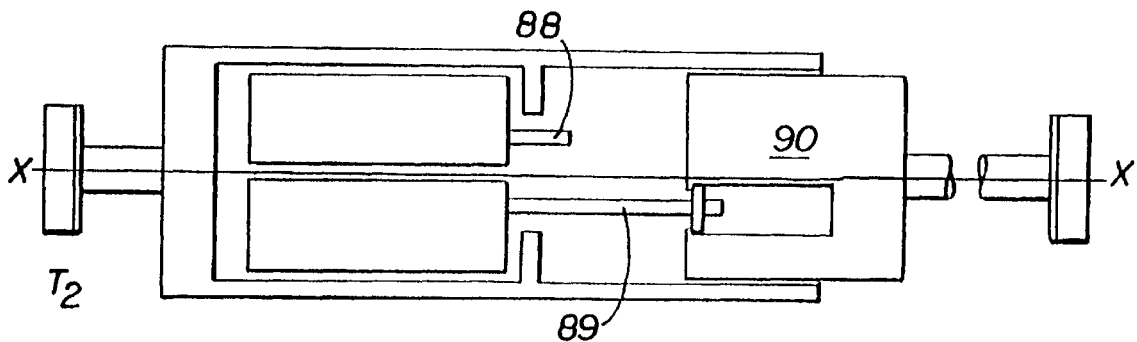

At time $T_2$, shown in FIG. 9(c), the compressive stress has been replaced by a tensile stress in beam 99 along axis x—x moving pusher 90 and shaft 89 to the right.

$T_3$

Figure 9D:
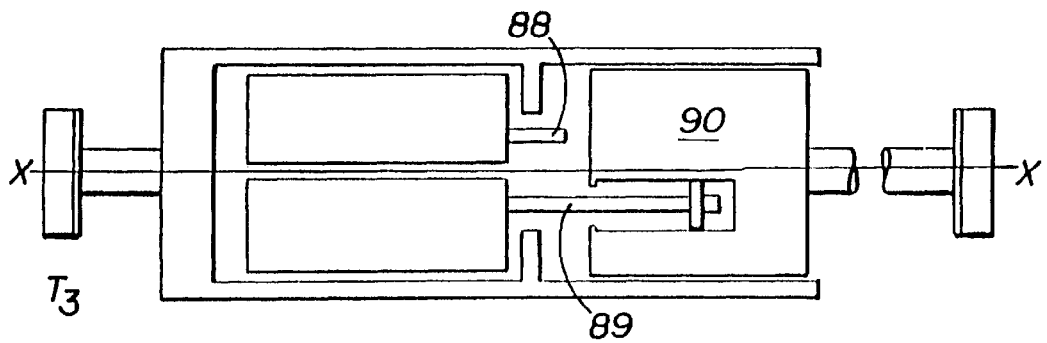

FIG. 9(d) shows unit 78 again at rest with no stress applied to beam 99. The position of shaft 88 corresponds to the maximum deflection caused by compressive strain in beam 99 since time $T_0$, while the position of shaft 89 corresponds to the maximum deflection caused by tensile strain in beam 99 since time $T_0$.

Figure 12:
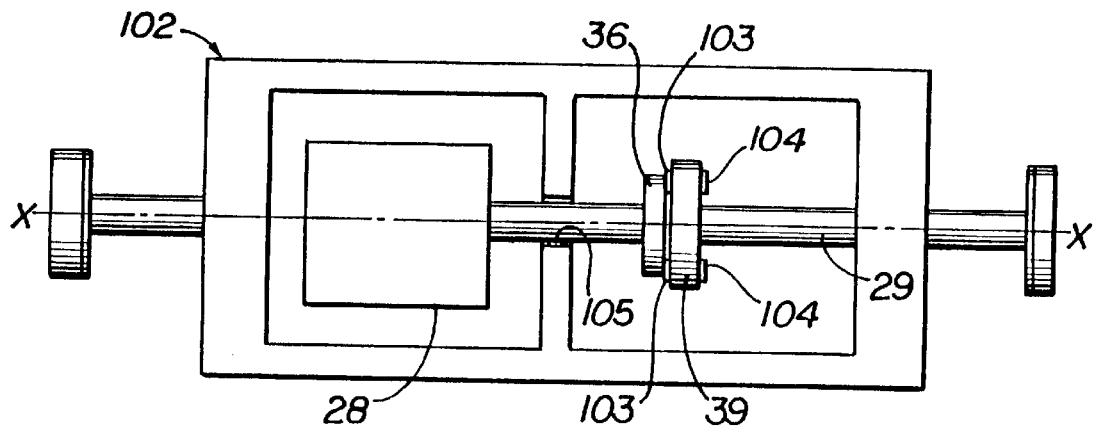
FIG. 12 shows an alternative strain sensing unit.

FIG. 12 shows an embodiment in accordance with the principles of the invention and adapted to selectively measure maximum or instantaneous strain. Strain sensing unit 102 is a pusher style unit similar to unit 38 of FIG. 3. However, head 36 and pusher 39 may be fixedly connected using bolts, severally indicated at 103, extending from head 36 through apertures in pusher 39 (not shown) and nuts, severally indicated at 104. A further difference is the incorporation of a set screw structure 105 in unit 102 instead of a O-ring as used in unit 38.

When nuts 104 are threaded onto bolts 103, any movement of pusher 39 causes core 28 to similarly move. In this configuration, set screw structure 105 is disengaged as unnecessary because core 28 is, in effect, an extension of fixedly mounted pusher 39 and unlikely to shift due to spurious forces. Thus, unit 102 can provide an instantaneous measurement of strain in a manner identical to known passive gauges. Unit 102 can act as an active gauge if sampling and storage means are added.

If nuts 104 are not threaded onto bolts 103 and set screw structure 105 engages core 28, unit 102 acts in accordance with the principles of the invention as shown by unit 38 of FIG. 3. Accordingly, unit 102 can selectively act as a traditional passive gauge, an active gauge or in accordance with the principles of the instant invention.

The invention also contemplates the use of reset devices to reset the core to its condition at an initial reference. Conditions of a strain sensing unit at an initial reference must be known to enable the unit to measure maximum strain over a given time period. Accordingly, providing a reset capability to the strain sensing unit is important.

Figure 13A:
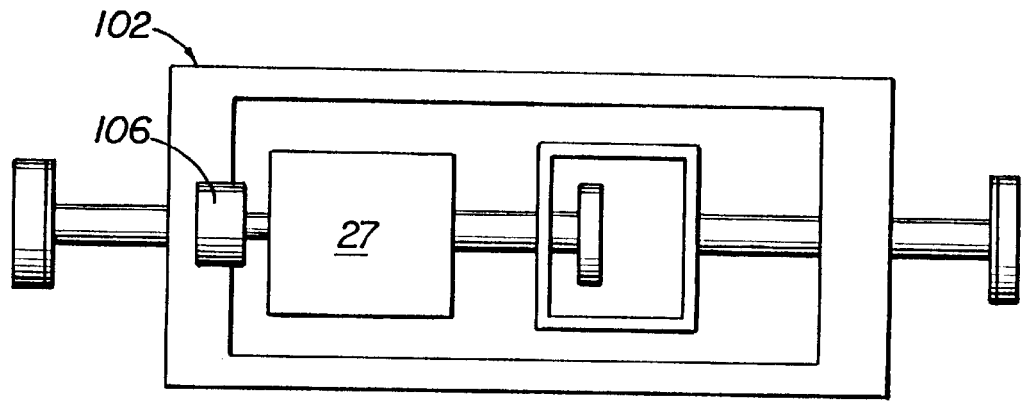
FIGS. 13(a)–(b) show strain sensing units including reset mechanisms.
Figure 13B:
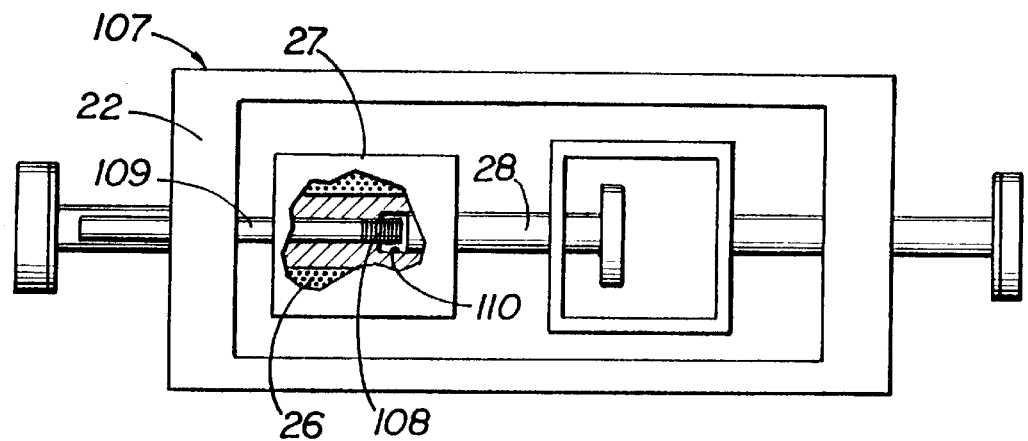

In FIG. 13(a), a solenoid 106 is connected to housing 27. Activating solenoid 106 draws core 28 back into housing 27 to its condition at the initial reference. Alternatively, FIG. 13(b) shows a manual method for returning core 28 to its condition at the initial reference. To reset unit 107, the threaded end 108 of a rod 109 is passed through openings in housings 22 and 27 (not shown). The left end of core 28 includes a threaded blank bore 110. End 108 threads into bore 109, thus fixedly connecting rod 109 and core 28. Pulling rod 109 to the left draws core 28. Thus, core 28 can be reset to its condition at the initial reference.

Figure 14:
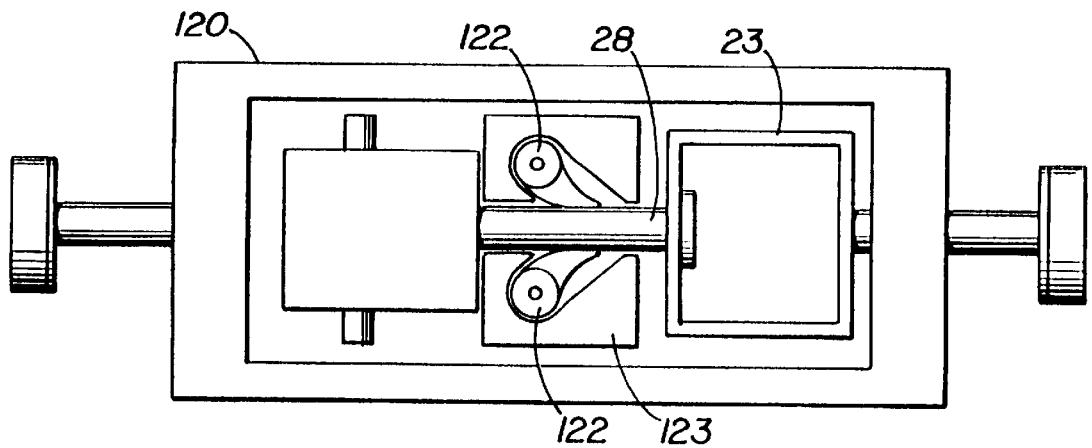
FIG. 14 shows a mechanism to prevent relaxation of the core in a phase change strain gauge.

One embodiment of the invention maintains the elongation of a TRIP core in a phase change strain gauge change strain gauges. FIG. 14 shows a phase change strain gauge 120. Core 28 here is made of a TRIP alloy initially having a non-ferromagnetic structure and is fixedly mounted to sensor 21 at one end. As such, when strain causes bracket 23 to move to the right, core 28 elongates. This elongation causes a phase change making the structure of core 28 ferromagnetic. When the strain is relieved, cams, severally indicated at 122, of one-way motion cam collar 123 maintain the elongation of TRIP core 28, preventing reversal of phase change in TRIP core 28 and thus, maintaining the condition of core 28 at maximum stress.

Figure 15:
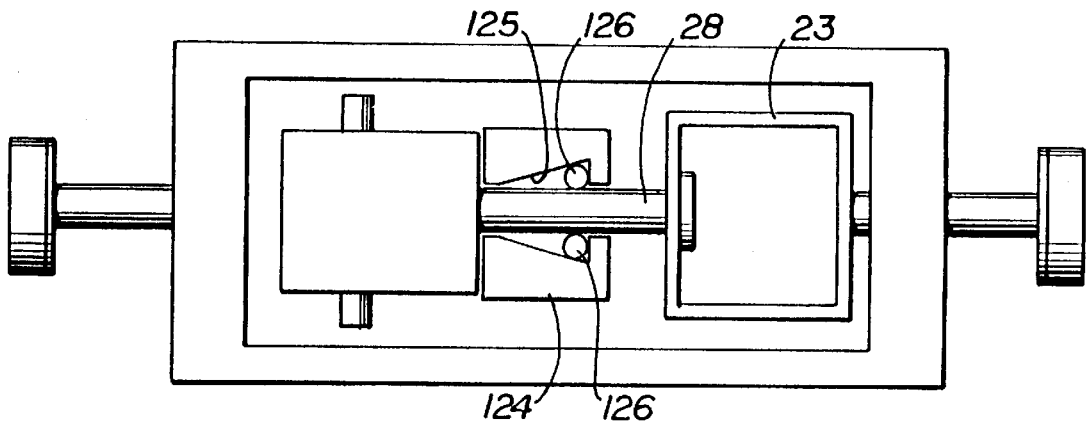
FIG. 15 shows an alternative mechanism to prevent relaxation of the core in a phase change strain gauge.
Figure 16:
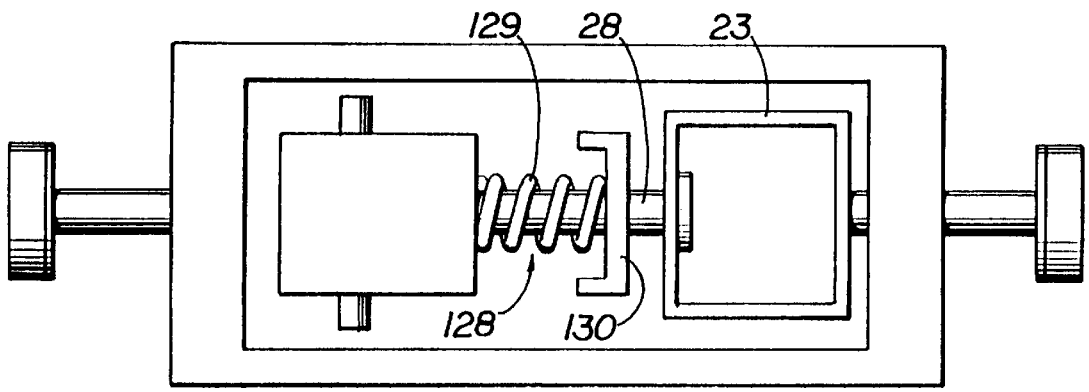
FIG. 16 shows an alternative mechanism to prevent relaxation of the core in a phase change strain gauge.

Other mechanisms can replace cams 122. FIG. 15 shows use of a ball-bearing collar 124. Chamber 125 surrounds core 28. Bear bearings, severally indicated at 126, roll freely when core 28 elongates. If core 28 begins to relax, the walls of chamber 125 prevent ball bearings 126 from rolling, thus preventing any contraction. FIG. 16 illustrates use of a calibrated extension spring assembly 128 including spring 129 and collar 130. Collar 130 is mounted to core 28. Spring 129 prevents collar 130, and thus core 28, from relaxing.

Modifications

Although preferred embodiments of the invention have been disclosed and described, those skilled in the art will recognize modifications can be made without departing from the spirit of the invention.

What is claimed:

1. A device for measuring peak deflection in a structural member comprising:

a first position sensor having a first fixed reference and a first member, said first position sensor adapted to generate a signal corresponding to a distance between a first measurement point of said first member and said first fixed reference, said first measurement point of said first member being moveable along a first axis passing through said first member and said first fixed reference;

a stop operatively engaged with said first member so that said stop moves said first measurement point on said first member relative to said first fixed reference in a first direction along said first axis in response to maximum stress exerted in said first direction and said stop releases said first member in response to stress exerted in a second direction along said first axis reciprocal to said first direction; and whereby said first measurement point of said first member remains at its point of greatest travel in relation to said first fixed reference along said first axis in said first direction.

2. The device according to claim 1 wherein said stop moves said first measurement point on said first member relative to said first fixed reference by moving said first member along said first direction.

3. The device according to claim 1 wherein said stop moves said first measurement point of said first member relative to said first fixed reference by elongating said first member.

4. The device according to claim 1 wherein said stress is tensile.

5. The device according to claim 1 wherein said stress is compressive.

6. The device according to claim 1 further comprising a second position sensor having a second fixed reference and a second member, said second position sensor adapted to generate a signal corresponding to a distance between a second measurement point on said second member and said second fixed reference, said second measurement point on said second member being moveable along a second axis passing through said second member and said second fixed reference, said first and second axes being generally parallel;

wherein said stop operatively engages said second member so that said stop moves said second measurement point of relative to said second fixed reference in said second direction along said second axis in response to maximum stress exerted in said second direction along said second axis, and said stop releases said second member in response to stress exerted in said first direction; and whereby said second measurement point on said second member remains at its position of greatest travel in relation to said second fixed reference along said second axis in said second direction.

7. The device of claim 1 wherein said stop is a pusher.

8. The device of claim 1 wherein said stop is a hollow member, said hollow member includes a wall defining a chamber, said wall having an opening larger than the diameter of a first end of said member, a first end of said member passes through said opening into said chamber, said first end ending in a head larger in diameter than said opening.

9. The device of claim 6 wherein ends of said first and second members face one another and said stop includes a pusher positioned between said first and second members, wherein movement of said pusher in said first direction beyond its previous maximum movement in said first direction moves said first member in said first direction, and movement of said pusher in said second direction beyond its previous maximum movement in said second direction moves said second member in said second direction.

10. The device of claim 6 wherein said first and second members are generally parallel and adjacent one another, and said stop includes a pusher adapted to move said first member in said first direction without moving said second member when said pusher moves in said first direction beyond its previous maximum movement, and further adapted to move said second member in said second direction without moving said first member when said pusher moves in said second direction beyond its previous maximum movement in said second direction.

11. The device of claim 1 wherein said first position sensor is an electrical displacement transducer.

12. The device of claim 1 wherein said first position sensor is a linear variable differential transformer.

13. The device of claim 1 wherein said first position sensor is a linear potentiometer.

14. The device of claim 1 wherein said first position sensor is a capacitance displacement sensor.

15. The device of claim 1 wherein said first position sensor is an optical displacement transducer.

16. The device of claim 1 further comprising a friction member to prevent slippage of said first member.

17. The device of claim 16 wherein said friction member is an O-ring and said first member proceeds through said O-ring.

18. The device of claim 17 wherein said friction member is a friction block in adjustable pressure contact with said first member.

19. The device of claim 18 wherein said pressure of said friction block on said first member is adjusted by a set screw structure.

20. The device of claim 1 wherein said first member is selectively connectable to said stop and wherein when said first member is not connected to said stop, said stop is operatively engaged with said first member so that said stop moves said first member in said first direction along said first axis in response to maximum stress exerted in said first direction and said stop releases said first member in response to stress exerted in said second direction, whereby said first measurement point on said first member remains at its point of greatest travel in relation to said first fixed reference along said first axis in said first direction, and wherein when said first member is connected to said stop, said first member moves with any deflection of said stop.

21. The device of claim 1 further comprising a reset mechanism.

22. The device of claim 20 wherein said reset mechanism is a solenoid connected to said first position sensor and adapted to move said first member when activated.

23. The device of claim 21 wherein said reset mechanism is a rod adapted to engage said first member.

* * * * *